United States Patent Office

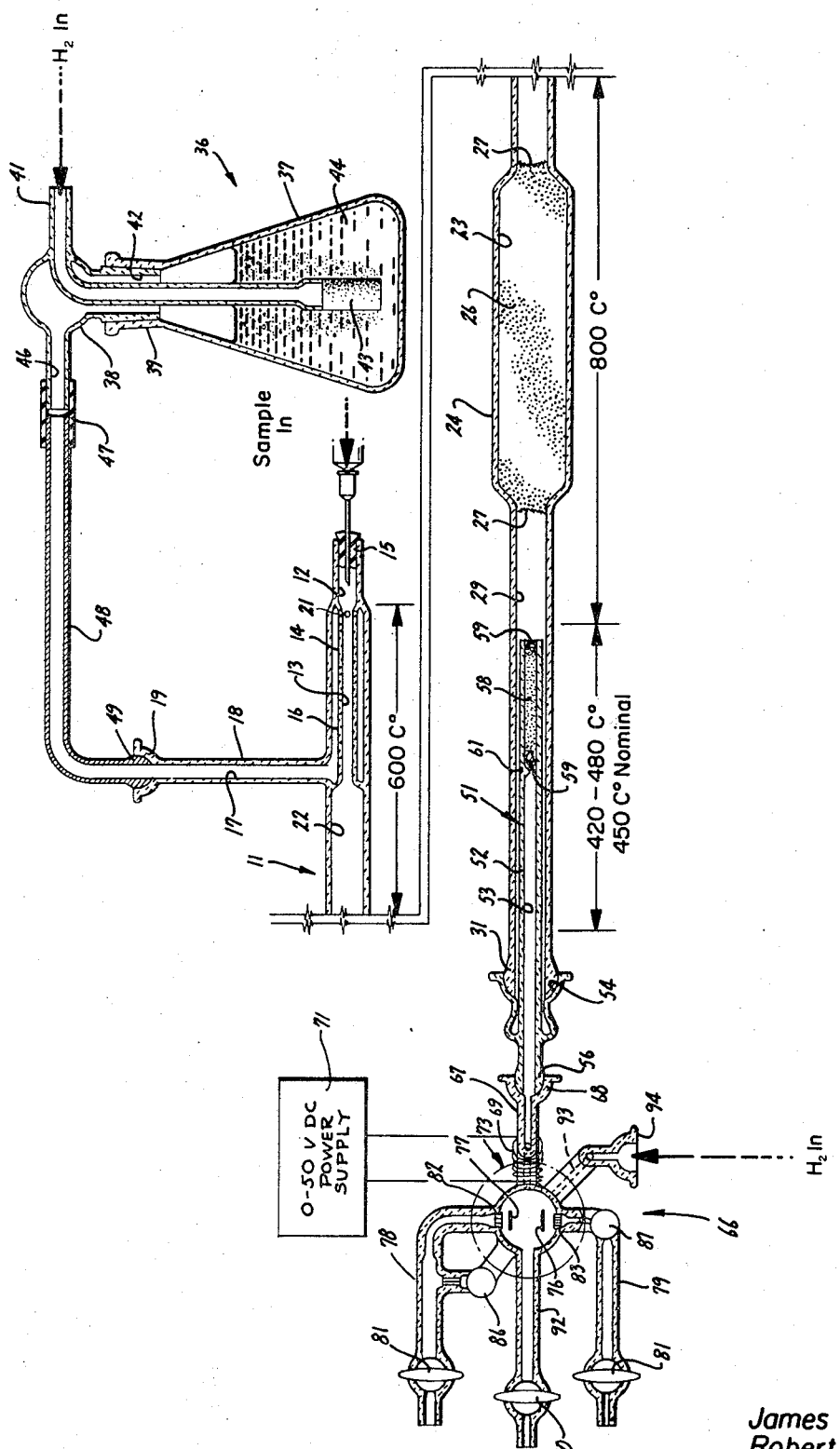
INVENTOR.
James A. McNulty
Robert T. Moore

3,565,583
Patented Feb. 23, 1971

3,565,583
METHOD AND APPARATUS FOR DETERMINATION OF NITROGEN IN WATER AND IN OXYGENATED HYDROCARBON MATRICES
James A. McNulty, Belmont, and Robert T. Moore, Palo Alto, Calif., assignors to Dohrmann Instruments Company, Mountain View, Calif., a corporation of California
Filed Jan. 15, 1968, Ser. No. 697,901
Int. Cl. G01n 27/42, 31/08, 31/12
U.S. Cl. 23—230
2 Claims

ABSTRACT OF THE DISCLOSURE

Method and apparatus for the determination of nitrogen in water and in oxygenated hydrocarbon matrices in which the sample is volatilized and thereafter pyrolyzed by the use of a catalyst. After pyrolysis, acidic type gases including $CO_2$ are removed and thereafter an electrochemical determination is made to determine whether a nitrogen compound is present in the residual gas. In the apparatus, a specific type of scrubber is utilized for removing the acidic type gases including $CO_2$ from the products of pyrolysis.

BACKGROUND OF THE INVENTION

In the past, electro-chemical analyses of nitrogen have been made. However, in the past it has been difficult, if not impossible, to make a determination of the nitrogen content in water or in oxygenated hydrocarbon matrices. Difficulty has been experienced in making this latter type analysis because in the pyrolysis reaction in which the sample stream is passed over a hot nickel catalyst, oxygen was present in the sample stream which created the classical water-gas reaction. In other words, the oxygen was converted to water and, in addition, carbon dioxide and carbon monoxide are formed as products of the pyrolysis because of small amounts of carbon contained within the furnace. Any carbon monoxide formed is further converted to carbon dioxide by steam in the cooler portions of the furnace below 500° C. These compounds then pass through the furnace and enter the titration cell. The carbon dioxide in the titration cell will change the pH of the electrolyte in the cell which would mask or completely obscure any change in the pH of the cell caused by any ammonia which entered the cell. The ammonia is formed during pyrolysis from any nitrogen compounds contained in the sample. Thus, it can be seen that such a system cannot be made specific to nitrogen. In the past, it was not appreciated that it was carbon dioxide formed during pyrolysis which destroyed the specificity of the test being used. There is, therefore, a need for a new and improved apparatus for the determination of nitrogen in water and in oxygenated hydrocarbon solvents.

SUMMARY OF THE INVENTION AND OBJECTS

The method for the determination of nitrogen in water and in oxygenated hydrocarbons comprises the steps of volatilizing the sample to be analyzed to determine whether or not it contains organic and/or inorganic nitrogen. The volatilized sample is pyrolyzed with the use of a catalyst to convert any organic or inorganic nitrogen to ammonia. Thereafter, the products of pyrolysis are scrubbed with an acidic scrubber which is stable at the desired temperature and which is capable of removing acidic gases including carbon dioxide from the products of pyrolysis. After the sample has been scrubbed, an electrochemical determination is made to determine whether ammonia is present in the sample.

In the apparatus, a scrubber is utilized for scrubbing the products of pyrolysis. The scrubber is formed of a material which is a solid and is stable at a temperature above 350° C. and which will not melt at a temperature below approxmately 600° C. The scrubber must also be capable of removing the carbon dioxide from the gas stream. In addition, it must be in form which is easy to use and which can be prevented from passing into the titration cell which is utilized for making the electrochemical determination.

In general, it is an object of the present invention to provide a method and apparatus which can be utilized for readily determining the presence of nitrogen in water and in oxygenated hydrocarbon matrices.

Another object of the invention is to provide a method which can be readily and easily used in the laboratory.

Another object of the invention is to provide an apparatus which utilizes a particularly unique scrubber for removing the acidic type gases.

Another object of the invention is to provide a method of the above character in which acidic type gases including carbon dioxide are removed from the products of pyrolysis.

Another object of the invention is to provide an apparatus of the above character which is relatively inexpenisve and which can be readily operated.

Additional objects and features of the invention will appear from the following description in which the preferred embodiments are set forth in conjunction with the accompanying drawing.

BRIEF DESCRIPTION OF THE DRAWING

The drawing shows a plan view of the apparatus incorporating the present invention.

DESCRIPTION OF THE PREFERRED EMBODIMENT OF THE APPARATUS AND METHOD

The apparatus utilized in performing the method for determining the nitrogen in water and in oxygenated hydrocarbon solvents or matrices is shown in the drawing and consists of a pyrolysis tube 11 which is mounted in a furnace of a conventional type such as the Type S–200 Pyrolysis Furnace manufactured and sold by Dohrmann Instruments Company of Mountain View, Calif. The pyrolysis tube 11 is formed of a suitable high temperature material such as quartz. The pyrolysis tube 11 is provided with an inlet 12 that is in communication with a small passage 13 provided by a tube 14 within the pyrolysis tube 11. A rubber stopper 15 is mounted in the inlet end 12. The sample to be analyzed can be inserted into the inlet end by a syringe which is pushed through the stopper 15.

An annular passage 16 is formed in the pyrolysis tube 11 between the wall of the tube 11 and the tube 14 which is in communication with a passage 17 in a right-angle extension tube 18. The end of the tube 18 is provided with a sprocket 19 which is adapted to receive a ball as hereinafter described. The annular passage 16 is in communication with the passage 13 through small circumferentially spaced slots 21 provided in the side wall forming the tube 14 near the inlet end of the passage 13. Both the extension tube 18 and the inlet portion of the pyrolysis tube 11 are heated to the desired temperature as hereinafter described.

The flow passage 13 is in communication with a larger flow passage 22 in the pyrolysis tube 11 which is in communication with a larger passage 23 with an enlarged portion 24 provided intermediate the ends of the pyrolysis tube 11. This enlarged portion 24 contains the catalyst to be utilized in conjunction with the present method. One catalyst found to be particularly suitable consists of nickel granules 26 of a size ranging from 20 to 50 mesh. The granules 26 are held within the enlarged portion 24 by fine cup-shaped nickel screens 27 on opposite ends of the enlarged portion 24 and which have been pushed into place within the pyrolysis tube 27 and frictionally engage the inner side walls of the pyrolysis tube. The enlarged portion 24 is in communication with a flow passage 29 and which extends through a ball 31 provided at the other end of the pyrolysis tube 11.

Means is provided for supplying hydrogen to the pyrolysis tube 11 and consists of a tank (not shown) containing hydrogen which is connected to a gas humidifier 36. The gas humidifier 36 consists of a flask 37 of a suitable type such as a 250 milliliter Erlenmeyer flask formed of "Pyrex." A cap 38 is mounted on the flask and a ground joint connection 39 is provided for suitably forming a seal between the cap 38 and the flask 37. The cap 38 is provided with an inlet tube 41 through which the hydrogen is introduced. The tube 41 extends inwardly and downwardly through a passage 42 provided within the cap to a point near the bottom of the flask 37. The lower end of the tube 41 is covered by a fritted member 43 which serves to split up the gas and break it up into many fine bubbles. The flask is normally filled with water to a suitable level such as the level 44 indicated in the drawing. Bubbling of the hydrogen through the water serves to wet the hydrogen which passes upwardly through the passage 42 and through an outlet tube 46. Outlet tube 46 is connected by a coupling 47 to tubing 48 of a suitable type such as copper tubing. The copper tubing is provided with a ball 49 which fits in the socket 19 of the extension tube 18.

Means are provided for scrubbing the products of the pyrolysis within the pyrolysis tube 11 and consists of a scrubber tube 51 formed of a suitable high temperature material such as quartz which is provided with a length of tube 52 which has a flow passage 53 therein. The passage 53 is open at one end and the other end passes through a socket 54 and through a ball 56. As can be seen from the drawing, the scrubber tube 51 is mounted on the pyrolysis tube 11 so that the tube section 52 is disposed within the pyrolysis tube with the ball 31 seated within the socket 54. A scrubbing material 58 of a particular type is disposed in the inlet end of the tube section 52 and is held in place in a suitable manner. One means found to be particularly satisfactory for holding the scrubbing material in place are quartz wool plugs 59 disposed on opposite sides of the scrubbing material and frictionally engaging the side walls of the tube 52 and serving to hold the scrubbing material in place within the scrubber tube. A dimple 61 in tube 52 also serves to hold the innermost quartz plug 59 in place.

A material which has been found to be particularly satisfactory is calcium oxide which has been screened so that the particles are not too small and also so that they are not too large. Thus it has been found that calcium oxide which has been screened so that it is within 50 to 20 mesh, and preferably approximately 30 mesh, is particularly satisfactory. As hereinafter described, the primary purpose of the scrubber material provided in the scrubber tube is to remove all acidic type gases, and in particular to remove all carbon dioxide. The material must be capable of forming a hydroxide which is stable above approximately 350° C. and which will not melt at a temperature below approximately 600° C. It also must be capable of removing carbon dioxide from the gas stream and it must be in a form which is easy to use, i.e., it must not be in the form of a dust or powder. The material also must be alkaline. In addition to calcium oxide, other alkaline earth metal oxides should form a suitable scrubbing material.

The measurement which is to be made of the sample as it passes from the scrubber tube 51 is supplied to a conventional titration cell such as the T-400H manufactured and sold by Dohrmann Instruments Company of Mountain View, Calif. A titration cell of this general type is disclosed in United States Letters Pat. 3,032,493 and in copending application Ser. No. 412,146, filed Nov. 18, 1964. Such a cell 66 includes an inlet tube 67 which is provided with a socket 68 in which the ball 56 of the scrubber tube 51 is adapted to fit. A strip heater 69 of a conventional type is wound around the inlet tube 67 and is connected to a suitable source of power 71 such as 0 to 50 volts D-C. The inlet tube 67 is connected into the vessel 73 which contains the electrolyte. A generator anode 76 and a sensor electrode 77 are disposed in the electrolyte. A pair of side arms 78 and 79 are mounted on the vessel 73 and are in communication with the electrolyte in the vessel through perforated plates 82 and 83. A reference electrode 86 is mounted in the side arm 78 and is in communication with the electrolyte in the vessel 73. A generator cathode 87 is provided in the side arm 79. An outlet tube 92 is provided on the bottom side of the vessel which has a stop cock 90 mounted therein.

An additional inlet tube 93 is provided for the vessel and has a socket 94. Additional hydrogen is fed into this additional inlet 93 for a purpose hereinafter described.

The titration cell 66 is connected to suitable electronics such as to the C-200 Microcoulometer manufactured and sold by Dohrmann Instruments Company of Mountain View, Calif., and the R-100 Gas Chromatography Recorder also manufactured and sold by Dohrmann Instruments Company of Mountain View, Calif.

Operation of the apparatus shown in the drawing for determining the presence of nitrogen in water and in oxygenated hydrocarbon matrices may now be described. The furnace is first placed in operation and provides three heat zones. Thus, the inlet end of the pyrolysis tube 11 is heated to a temperature above 100 C. and preferably in the vicinity of 600° C. The intermediate portion of the pyrolysis tube which includes the enlarged section 24 containing the nickel granules 26 is heated to a temperature of approximately 800° C. The portion of the pyrolysis tube which contains the scrubber tube 51 is heated to a temperature ranging from 420 to 480° C., and preferably is maintained at a temperature of approximately 450° C.

In preparation of the scrubbing material 58 within the scrubber tube for the analysis herein described, the furnace is operated to take the temperature of the scrubber material up to a temperature which drives off all of the impurities in the material. Such a temperature would be approximately 800° C. for calcium oxide. Increasing the temperature also cleans off the scrubber tube. During this heating of the scrubber material, all water is also driven off of the scrubber material. Thereafter, the scrubbing material is brought down to the normal operating temperature of 450° C. The hereinbefore described steps can be called the steps for activation of the scrubber material for the function it is to perform in the present determination.

Pure hydrogen is then bled into the second inlet tube 93 and this hydrogen is utilized for determining whether the cell 66 is operating properly and in particular with respect to its response characteristics and its quantitation characteristics independent of any chemical reaction or pyrolysis that may occur within the pyrolysis tube in the furnace. This flow of hydrogen through the second inlet tube is continued throughout the entire measurement process. It has been found that this additional hydrogen flow tends to establish a one-atmosphere pressure of hydrogen in the cell which is desirable for the making of accurate measurements.

The carrier gas which is hydrogen is introduced into the gas humidifier 36. The hydrogen is broken up into very small bubbles by the fritted member 43. The bubbles pass upwardly through the water contained within the flask 37 and are wetted. This wetted hydrogen passes through the passage 18 in the tube 17 and thence into the annular passage in the pyrolysis tube surrounding the inner tube 16. As soon as the hydrogen enters this area, any water carried by the hydrogen is immediately vaporized because of the high temperature of the inlet section of the pyrolysis tube. This vaporized water is carried by the carrier stream of hydrogen through the small openings or slots 21 and passes rearwardly where it wipes over the septum or rubber stopper 15 in the inlet section of the tube and then passes forwardly through the passage 14 and into the nickel catalyst 26. Any traces of carbon which are present in the nickel are eliminated because water and hydrogen are being supplied to the hot nickel. Thus, any carbon residue would be removed. The carrier gas with the vaporized water therein also passes into the scrubber material 58 and reacts with the calcium oxide to transform the calcium oxide into its hydroxide form. This is carried out until all or substantially all of the calcium oxide is in the hydroxide form and reaches an equilibrium state at approximately 450° C. In other words, it is a hydrated form of calcium oxide which is formed and which is utilized for the scrubbing action hereinafter described.

After the pyrolysis tube has been cleaned of all carbon deposits within the same and after the calcium oxide has been hydrated, the apparatus is ready for the introduction of the sample to be analyzed. Typically, the sample as, for example, a quantity of 5 to 10 microliters, is introduced by inserting a syringe through the rubber stopper 15 and slowly depositing the sample within the passage 14. The deposited sample is almost immediately volatilized because of the high temperature of the inlet zone and is swept into and through the pyrolysis tube 11 by the hydrogen carrier gas. The hydrogen itself is heated in the extension tube 18 and as it sweeps rearwardly, it sweeps over the stopper 15 to volatilize any remaining sample which has been introduced and carries the same through the pyrolysis tube 11. The temperature of the inlet zone is sufficiently high that all organic and inorganic compounds in which there is interest are volatilized and are driven into the catalyst or intermediate zone which is at the 800° C. temperature. It should be readily apparent that, if desired, the inlet temperature can be operated at higher temperatures as, for example, as high as 1100° C., depending upon the sample being analyzed.

When the carrier gas brings the sample into the catalyst zone, the classical reduction of any organic or inorganic nitrogen within the sample to ammonia ($NH_3$) occurs. Any carbon molecules which are present are broken up and the carbon atoms are converted to methane ($CH_4$). Components such as chlorine or halogen which may be present are converted to a form of acid gas such as HCl or hydrogen halide. In addition to the formation of ammonia and methane and acid gases, it is believed that higher orders of carbon and hydrogen are formed, as well as traces of $CO_2$.

It is important that the sample not be introduced too rapidly because if there is too much water introduced, the chemical equilibrium is offset.

All the products of pyrolysis described above are carried onwardly through the pyrolysis tube 11 by the hydrogen carrier gas and pass into the scrubber tube 51 and the scrubber material 58 disposed therein. As hereinbefore explained, the scrubber material is held in place by quartz wool plugs 59 so that the carrier gas with the products of the pyrolysis can readily pass through the same and into the scrubber material. This scrubber material is fine enough so that there is intimate contact between the scrubber material and the products of pyrolysis. However, the scrubber material is not so fine that it is carried with the hydrogen carrier stream into the cell.

Any carbon dioxide reacts with the scrubber material to form an insoluble carbonate which is precipitated in the scrubber material. In other words, it stays in the scrubber tube. The reaction for calcium hydroxide is:

$$Ca(OH)_2 + CO_2 \rightarrow CaCO_3 + H_2O$$

The scrubber material also reacts with any acid gases contained in the products of pyrolysis to form calcium chloride. The reaction is:

$$Ca(OH_2) + 2HCl \rightarrow CaCl_2 + 2H_2O$$

All these materials which are formed in the scrubber tube have a melting temperature which is above the temperature in the scrubber tube and, therefore, remain as solids in the scrubber tube.

Since all the acid gases and any carbon dioxide and carbon monoxide have been scrubbed out of the products of pyrolysis, all that remains is any ammonia which may be present as well as methane or other derivatives of the carbon hydrogen series which pass into the capillary inlet tube 67 of the titration cell 66. In the cell, the ammonia reacts with the electrolyte. A typical cell reaction is as follows:

$$NH_3 + H_2O \rightarrow NH_3OH$$

$$NH_4OH + H^+ \rightarrow NH_4^+ + H_2O$$

The hydrogen ion depletion in the electrolyte is detected by the reference/sensor electrodes and is replaced electrically at the generator electrodes by a current from the microcoulometer. The current flow is measured by the recorder and calculations are made to determine the number of microequivalents of H+ which are generated. These are equal to the number of microequivalents of ammonia which enter the cell.

In this way, it can be seen that all of the ammonia which is in the products of pyrolysis has been scrubbed to remove the acidic gases including any carbon dioxide. The ammonia is then injected and trapped in the cell. Each ammonia molecule which comes into the cell reacts with one hydrogen ion which shifts the hydrogen ion concentration in the cell. The cell detects this change in the hydrogen ion concentration and regenerates the depleted hydrogen ions coulometrically internally within the cell.

In the foregoing it can be seen that the hydrogen acts as a carrier gas for carrying the volatiles and sweeps the volatiles into the catalytic reaction zone. In addition, the hydrogen gas is requried for the reduction or the conversion of the nitrogen to ammonia. The scrubber which is used must scrub out any acid gases formed in the reaction zone. They must be stable at temperatures above the decomposition point of the ammonium halides. Thus, for example, if the scrubber is operated at a temperature of 200° C. and both ammonia and HCl were present, ammonium chloride would be formed which would precipitate and prevent the ammonia from entering the titration cell. Thus, the scrubber must be operated at temperaure above the decomposition temperatures of ammonium chloride, that is, above 350° C. The scrubber must be stable at these temperatures. It must be alkaline so that it can scrub out acid gases such as HCl. In addition, it must have the capability of scrubbing out any carbon dioxide and also carbon monoxide.

The acid gases must be removed for making the nitrogen determination because the cell is pH sensitive. Thus, in order to make the determination specific to nitrogen, all other products of pyrolysis must be scrubbed out which would affect or change the pH of the electrolyte in the titration cell. Nitrogen is the only compound or element likely to be present in the sample which, when reduced in a hydrogen atmosphere, will form a base. Other compounds form acid gases such as chlorine which would form hydrochloride acid, or sulphur which would make hydrogen sulphide or carbon which would make trace amounts of carbon dioxide. All of these are of the acidic type and can be scrubbed out by the particularly novel scrubber which has been provided.

The same type of determination can be utilized for ascertaining the nitrogen content of a water sample containing inorganic nitrogen, such as calcium nitrate. In such a case, because the melting point of calcium nitrate is approximately 560° C., it is necessary to operate at temperatures above this temperature in order to maintain movement of the calcium nitrate down into the hot nickel catalytic zone and also above that temperature in order to facilitate rapid reaction of the nitrate to form ammonia.

By way of example, a chart is set forth below which shows that many different types of standard nitrogen compounds can be analyzed regardless of whether they carry inorganic or organic nitrogen.

chemically analyzing the scrubbed product of pyrolysis to determine quantitatively the nitrogen present in the sample.

2. A method as in claim 1 in which the alkaline earth hydroxide is calcium hydroxide.

| Compound | Formula | (Matrix) solvent | Theoretical, p.p.m. N | Percent recovery | User category |
|---|---|---|---|---|---|
| Diethanolamine | $HN(CH_2\cdot CH_2OH)_2$ | Distilled $H_2O$ | 11.4 | 100 | Industrial. |
| Do | Same as above | do | 1.14 | 100 | Do. |
| Aminotriazol | $C_2H_4N_4$ | do | 18.1 | 92 | Pesticide. |
| Chloropheniramine | | do | 9.5 | 100 | Drug. |

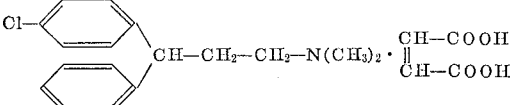

| Calcium nitrate | $Ca(NO_3)_2$ | do | 9.5 | 100 | Inorganic nitrates. |
| Potassium nitrate | $KNO_3$ | do | 10.5 | 100 | |
| Manganous nitrate | $Mn(NO_3)_2$ | do | 10.0 | 100 | |
| Nickel nitrate | $Ni(NO_3)_2$ | do | 10.7 | 100 | |
| Cystine (NBS Std.) | $C_6H_{12}O_4N_2S_2$ | .1M NaOH | 10.8 | 100 | Amino acids. |
| Tryptophan | $C_{11}H_{12}O_2N_2$ | do | 10.0 | 100 | |
| Bovine albumin | $C_{11}H_{12}O_2N_2$ | do | 23.6 | 100 | Protein. |
| Diethanolamine | $C_{11}H_{12}O_2N_2$ | Alcohol | 15.8 | 100 | Industrial |

From the above chart, it can be seen that it has been possible to obtain excellent results with the present method and apparatus in determining the amount of nitrogen in the compounds.

It is apparent from the foregoing that there has been provided a new and improved method and apparatus for the determination of nitrogen in water and in oxygenated hydrocarbon matrices. The apparatus is relatively simple and can be readily used. The method is one which can be readily performed and which is very accurate and precise.

What is claimed is:

1. In a method for the determination of nitrogen in water and in oxygenated hydrocarbon matrices, providing a carrier gas of hydrogen, introducing the sample to be analyzed in the carrier gas of hydrogen, heating the carrier gas and the sample introduced therein to volatilize the same, passing the volatilized sample over a nickel-containing catalyst at a temperature substantially in excess of 480° C., on the order of about 800° C., to cause pyrolysis to occur, scrubbing the products of pyrolysis with an alkaline earth hydroxide at a temperature ranging from about 420° C. to 480° C. to remove acidic type gases including carbon dioxide, and thereafter electro-

References Cited

UNITED STATES PATENTS

| 2,762,568 | 9/1956 | Sullivan | 23—254UX |
| 3,032,493 | 5/1962 | Coulson et al. | 204—195 |
| 3,131,348 | 4/1964 | Taylor et al. | 204—195X |
| 3,241,922 | 3/1966 | Walisch | 23—254X |
| 3,421,856 | 1/1969 | Stenger et al. | 23—230 |
| 3,427,238 | 2/1969 | Myers et al. | 204—195 |
| 3,428,432 | 2/1969 | Staunton et al. | 23—253 |
| 3,461,042 | 8/1969 | Martin et al. | 204—195 |

OTHER REFERENCES

Martin, "Fast and Sensitive Method for Determination of Nitrogen," Anal. Chem. 38:1209–13 (1966).

Coulson, "Selective Detection of Nitrogen Compounds . . . ," Chem. Abst. 65:14429d (1966).

Albert, "Determination of Nitrogen Compound Types . . . ," Anal. Chem. 39:1113–7 (1967).

MORRIS O. WOLK, Primary Examiner

D. G. CONLIN, Assistant Examiner

U.S. Cl. X.R.

23—230, 232, 253, 254; 204—195